July 6, 1965   R. W. CLARKE ET AL   3,193,811
TRANSDUCER SUPPORT AND POSITIONING ASSEMBLY
Filed Aug. 9, 1960   2 Sheets-Sheet 1
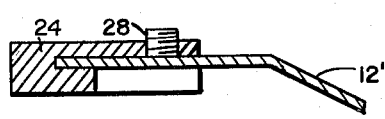
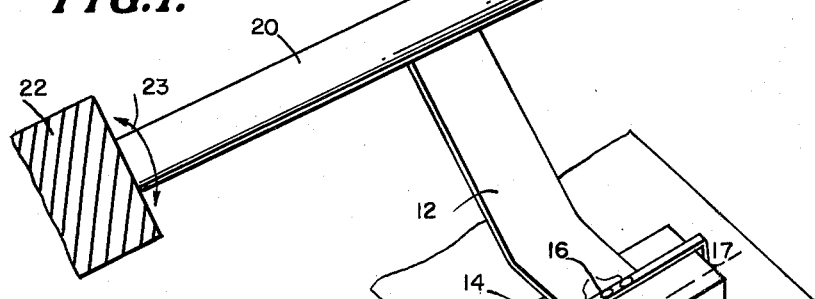
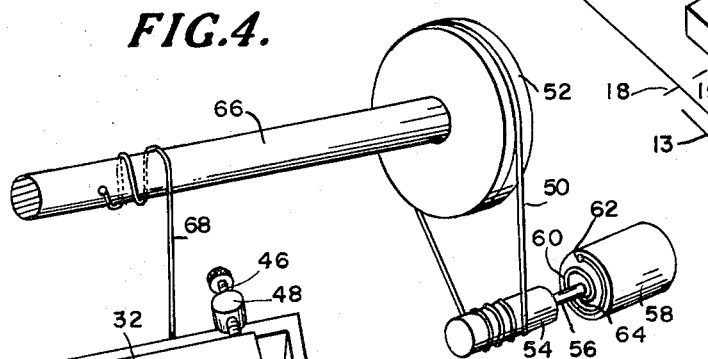
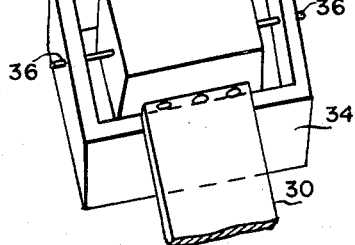
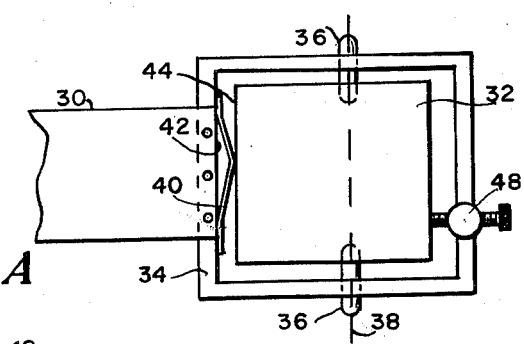
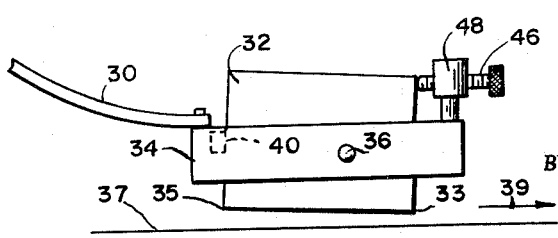
INVENTOR
RICHARD W. CLARKE
SHERMAN A. SUNDIN
BY Cushman, Darby & Cushman
ATTORNEYS

United States Patent Office 3,193,811
Patented July 6, 1965

3,193,811
TRANSDUCER SUPPORT AND POSITIONING ASSEMBLY
Richard W. Clarke, St. Louis Park, Minn., and Sherman A. Sundin, Seattle, Wash., assignors to Sperry Rand Corporation, New York, N.Y., a corporation of Delaware
Filed Aug. 9, 1960, Ser. No. 48,371
9 Claims. (Cl. 340—174.1)

This invention relates to positioning apparatus, and more specifically to an improved positioning and mounting arrangement for a transducer member whereby the transducer member is positioned in a predetermined spaced relationship relative to the surface of a moving record member and allowed three directions of movement to maintain same in the predetermined spaced relationship regardless of irregularities, eccentricities, warpage, etc., of the recording surface while at the same time prohibiting transducer movement in a direction transverse to the direction of surface movement. An additional feature of this invention is the provision of means for automatically lowering the transducer member into a predetermined spaced relationship (also known in the art as the proper "flying position") relative to the recording surface when transducer operation is required, and for automatically raising the transducer member from the recording surface into a rest position when transducer operation is not required.

Present day large scale recording systems such as used in computer memories, require the storage of extensive amounts of information. The most widely used method of achieving this storage capacity is through the use of a magnetizable recording surface, such as the peripheral surface of a cylindrical drum, or the flat surface of a tape or disc, upon which each bit of data occupies a small portion of the area thereof. The surface on which the data is stored is rotated or moved at high speeds. As a selected area passes in proximity to a transducer member, information is read therefrom or stored therein by the transducer member which is provided with signal means through which information or data is transmitted. The transducer member, generally referred to in the art as a read-write head, should, for optimum performance, be located and maintained in a predetermined position relative to but usually spaced from the moving recording surface. Once positioned in the proper spaced flying position, e.g., the transducer member position relative to the recording surface when the latter is rotating, the transducer should for optimum performance maintain this flying position regardless of surface irregularities, eccentricities or warpage.

The spacing between the transducer and storage members may be maintained in several ways. One method currently utilized in the art and illustrated herein, is to provide the transducer member with a bearing face or surface directly opposing the proximate rotating recording surface which, due to its movement, carries with it a boundary layer of fluid, usually air, in which it is immersed. This layer constitutes a fluid cushion between the bearing and recording surfaces which will exert a force thereon inversely related to the clearance distance therebetween, tending to keep transducer and storage members separated. A detailed analysis of this bearing theory may be found in an article by N. Muskat, F. Morgan, and N. W. Meres entitled "The Lubrication of Plane Sliders of Finite Width" published in the "Journal of Applied Physics" of March 1940. Briefly, it will be realized that for a given set of conditions, e.g., fixed recording surface speed, fluid viscosity, bearing surface-to-transducer mass ratio, etc., a constant separating force will be exerted upon the bearing and recording surfaces by the fluid cushion for a predetermined clearance distance therebetween.

However, in practice, recording surface irregularities, eccentricities, warpage, etc., occur.

Instead of always lying in a given path of movement, the surface may depart from that path in several ways. First, the surface may uniformly approach or recede from the transducer member. For example, if the surface is that of a drum, it may be eccentric. Second, the surface under one side of the transducer may approach or recede differently from the surface under another side of the transducer member. For example, on a drum surface, eccentricity may differ from point-to-point along the axis of the drum. Third, there may be a combination of the first two mentioned effects. Variation in separating forces vary accordingly.

In the copending application of Robert J. Eulberg having U.S. Serial No. 48,439 there is described a positioning arrangement which allows a transducer member movement in two directions i.e., movement vertical to the direction of movement of the recording surface, and movement about an axis parallel to the recording surface movement direction. At the same time, transducer movement in a direction transverse to the direction of recording surface movement is resisted.

The present invention is an improvement over the positioning apparatus therein described. In the present invention a single flat metallic strip mounting provides the transducer member with vertical loading and freedom of movement in the above two directions, while at the same time preventing transducer movement in a direction transverse to the direction of recording surface rotation. The transducer member further is pivotally mounted within a cradle arrangement provided with stop means, to allow movement in a third direction which permits the flying "angle of attack" to be self-adjusting. This is rotation about an axis transverse to the direction of recording surface movement, to thereby maintain a substantially constant angle relative to the recording surface. This angular relationship is also known in the art as the "flying angle." A further improvement herein contained is the provision of means for automatically lowering the transducer member into a predetermined spaced relationship with the recording surface when use thereof is desired, and for automatically raising same from the recording surface when use thereof is completed.

It is therefore a primary object of the present invention to provide an improved positioning and mounting apparatus for a transducer member to be supported by a fluid boundary layer. It is another object of the present invention to provide an improved positioning and mounting apparatus for a transducer member relative to a rotatable recording member which resists transducer member movement in a direction transverse to the direction of recording member rotation.

It is a still further object of the present invention to provide means for automatically lowering the transducer member into a predetermined spaced relationship relative to the recording member when same is rotating and automatically raising the transducer member away from said recording member when the same stops rotating.

Other objects and advantages of this invention will become obvious to those having ordinary skill in the art by reference to the following detailed description of exemplary embodiments of the apparatus and the appended claims. The various features of the exemplary embodiments may best be understood with reference to the following drawings, wherein:

FIGURE 1 illustrates in perspective one embodiment of the invention.

FIGURE 2 illustrates in cross section apparatus for providing a vertical loading force on the transducer member;

FIGURE 3A illustrates the side view of another embodiment of the invention;

FIGURE 3B illustrates the plan view of the embodiment of FIGURE 3A, and

FIGURE 4 illustrates in perspective still another embodiment of the invention.

Figure 1A:
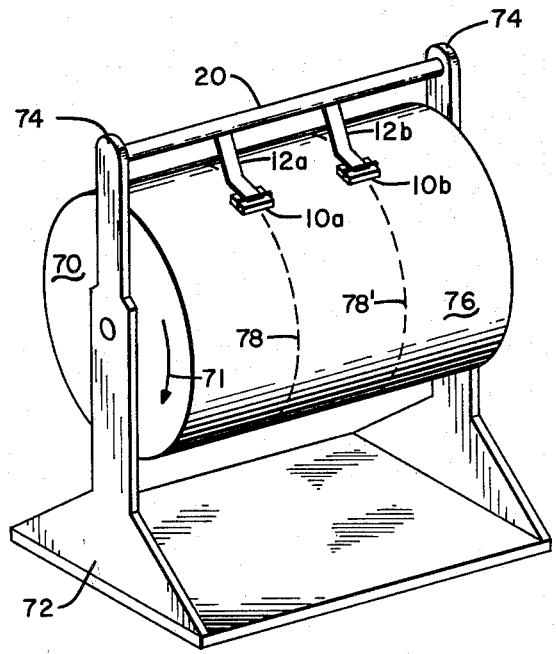
FIGURE 1A illustrates in perspective an embodiment of the invention as employed in a drum storage system.

Referring to FIGURE 1 there is shown a transducer member 10 in proximity to recording surface 11. Although surface 11 is shown flat, it is understood as explained in the aforementioned Eulberg application that the surface may be cylindrical, disk shaped or flat as with tape. Further, it is clear that although only one transducer member is shown, the invention is applicable to any number of transducer members. Surface 11 rotates relative to transducer member 10 in the direction of arrow 13 carrying with it an air cushion which as before described exerts a separating force on the transducer member 10. A flexible metal strip 12 is connected at one end to a U-shaped cradle member 14 by conventional means such as screws 16. The cradle member 14 is in turn coupled to transducer member 10 via pivot bearings at 15 and 17, thus causing the transducer member to be pivotably mounted thereto about axis 18 which is removed from the center of gravity of the transducer member in a direction away from the leading edge of the transducer member 10. This eccentric type of mounting is also shown in conjunction with the embodiment illustrated in FIGURES 3A and 3B. The resilient metal strip 12 is connected at the other end to support member 20 by conventional means. The support member is in turn attached to stationary frame member 22. Since metal strip 12 is long with respect to the cross sectional area thereof, the transducer member may move vertical to the recording surface and its direction of movement. Also, since strip 12 is quite thin compared to its width the transducer member may rotate about an axis parallel to the record movement direction as shown by arrow 13. This is a twisting effect upon strip 12. Thus there is provided two directions of transducer movement freedom, to allow same to maintain the predetermined spaced relationship regardless of recording surface irregularities. The third direction of movement is provided by the pivotal mount. The transducer is thereby allowed movement about an axis transverse to the direction of recording surface movement so as to assume a constant flying angle or angle of attack relative to the recording surface. Thus the transducer member positioning apparatus allows three directions of movement in response to separating force variations, thereby enabling the transducer member to maintain a constant predetermined spaced relationship relative to the recording surface regardless of the irregularities, eccentricities, etc. When the third degree of movement is not essential, metal strip 12 may be attached directly to element 10 with the element maintained at a fixed angle of attack.

Transverse movement of transducer element 10, i.e., movement thereof transverse to the relative movement direction 13 of surface 11, is resisted by resilient member 12 since the same has a width dimension in a plane parallel to the plane defined by said record movement which is great relative to the thickness of strip 12.

The metallic strip member 12 is also used to transmit the aforedescribed vertical loading force to the transducer member. To so do, strip 12 is placed in a state of flexure by mounting support structure 20 within frame member 22 so that it can rotate in the directions of arrows 23 and rotating same while the recording surface is moving at its normal speed, so that the transducer member is flying as close to the surface as is desired. This flexure creates a general vertical force which is applied to transducer member 10.

FIGURE 1A illustrates one embodiment of the present transducer mounting arrangement as it may be employed in a magnetic drum storage system. The storage drum 70 is mounted for rotation in the direction of the arrow 71 and guided in a path of travel by a base member 72. The base member 72 has a pair of upwardly extending portions 74 which fixedly hold a support member 20 with respect to the base member. The peripheral surface of the drum 70 is provided with a coating of magnetizable material 76 selected areas of which are magnetized to form record track sets 78 and 78'. Transducer members 10a and 10b are respectively connected to support member 20 by way of the resilient strips 12a and 12b which are disposed such that the transducers are properly oriented with respect to their associated record tracks.

An alternative way of causing the resilient strip member to transmit the vertical loading force to the transducer member is shown in FIGURE 2. Support member 24 mounts resilient strip 12'. A set screw 28 is provided which coacts with support member 24 to apply a force on strip 12' which is conveyed to the transducer member. By adjusting the set screw, the loading on the transducer member may be increased or decreased.

In order to provide for lateral adjustments of the transducer member, i.e., adjustments tranverse to the direction of movement of recording surface, the strip 12 member may be movably mounted to the support member, or if fixed thereto, the support member itself may be movably mounted to the frame.

FIGURES 3A and 3B show another embodiment for pivotably mounting the transducer member, FIGURE 3A being a side view and FIGURE 3B a top view thereof. A resilient member 30 of the type of strip 12 above described is connected to a support element (not shown). Transducer element 32, corresponding to element 10 in FIGURE 1, is mounted within cradle housing 34 via bearings 36. Preferably, the bearings are mounted off-center of the transducer as at axis 38, which is to the downstream side of the center of gravity of the element 32. However, limitation thereto is not intended, as design requirements will determine the best location of the bearings, depending upon distribution of mass of the element and therefore its center of gravity. The proper transducer flying angle, as shown, is with the edge 35 of the transducer slightly higher with respect to recording surface 37, as it rotates in the direction shown by arrow 39, than the trailing edge 33. Leaf spring 40 is mounted to housing 34 and extends between housing surface 42 and transducer surface 44. This spring prevents free transducer rotation about axis 38 while at the same time tending to cause the transducer to rotate clockwise about axis 38. A stop means consisting of screw member 46, threadedly coupled to housing 48 which in turn is supported on housing 34, prevents the transducer from rotating past the proper positive attack angle. As seen in FIGURE 3A, member 46 extends into the rotation path of transducer 32 and is adjusted to provide the required positive angle of attack, but will still allow clearance about 0.005 inch between the screw tip and the transducer when the transducer is flying. Additionally, the screw serves as a stop to prevent the trailing edge of the transducer from possibly striking the recording surface, which would occur if the transducer had too great a positive angle of attack when being placed in the flying position. The transducer 32 makes contact with screw 46 when at rest.

FIGURE 4 shows means for raising and lowering a transducer member, i.e., for placing the transducer in proximity to the recording surface during reading and writing operations, while automatically raising the transducer away from the recording surface to a rest position when the transducer is not being used. Although the raising and lowering means is hereinafter described in conjunction with the apparatus of FIGURES 3A and 3B limitation thereto is not intended, this means alternatively being usable with the apparatus of FIGURE 1 and any other suitably constructed transducer positioning and mounting apparatus.

Referring to FIGURE 4, an endless cable 50 is wrapped around pulley 52 and is wrapped about drum 54. The latter is mounted to shaft 56 of motor 58 which may for example be a Honeywell Modutrol motor. A spiral spring 60 is wound about shaft 56 with one end connected to the frame of motor 58, as at point 62, and the other end connected to the shaft 56, as at point 64. Cable 68 is attached at one end to cradle housing 34 and to shaft 66 at the other end, the shaft being attached to pulley 52. Although support means for pulley 52 and shaft 66 are not shown, conventional mounting thereof will suffice.

To lower the transducer 34 motor 58 is energized. The motor is a type which is limited as to the amount its shaft can rotate. Rotation of shaft 56 clockwise against the force of spiral spring 60, results in pulley 52 and shaft 66 rotating clockwise. The clockwise rotation of shaft 66 causes cable 68 to slacken so that the above discussed vertical loading forces provided by resilient member 30 places the transducer in the "head-flying" position. The rotation of motor shaft 56 is such to allow enough slack in cable 68 so that the cable does not impart any force onto the housing 32 when the transducer is in the flying position. The amount of motor shaft rotation is limited, however, so as not to exceed the elasticity limits of spring 60. When motor 58 is de-energized, the force of spring 60 rotates shaft 56 counterclockwise, causing cable 68 to be wound about shaft 66 thereby raising transducer away from the recording surface, placing same in a rest position.

In normal use, when the recording surface is not moving, the motor 58 is de-energized so that the transducer is in the raised position. When power is applied to the recording surface driving means, a timer (not shown) delays the energization of motor 58 until the surface gets up to speed. Then the motor is energized and the transducer is lowered into the flying position as above described. Whenever power is removed from the recording surface driving means, it is likewise removed from motor 58 so that the head is automatically raised, as above described.

Thus, it is apparent that there is provided by this invention apparatus by which the various objects and advantages herein set forth are successfully achieved.

Modifications of this invention not described herein will become apparent to those of ordinary skill in the art after reading this disclosure. Therefore, it is intended that the matter contained in the foregoing description and accompanying drawings be interpreted as illustrative and not limitative, the scope of the invention being defined in the appended claims.

What is claimed is:

1. In apparatus for maintaining a surface of a first member adjacent to but out of contact with a surface of a second member by action of fluid boundary layer therebetween while the surfaces are moving in a given direction relative to one another, comprising means for guiding said surface of the first member in a path of travel, support means, means for fixing the support means with respect to said guiding means, resilient means mounting said second member upon said support means, and means for moving the second member toward and away from said first member surface by other than said fluid boundary action, the last mentioned means including a rotatable element, flexible means connected to said second member, and motor means to revolve said element through a predetermined angular movement to wind said flexible means on said element to selectively move the second member toward and away from said first member surface.

2. Apparatus as in claim 1 wherein the motor means includes stop means for limiting rotational movement thereof during energization of the motor means, and resilient means to reversely rotate the motor means during de-energization thereof, said flexible element moving the second member away from the surface of the first member during said reverse motion.

3. Apparatus for maintaining a surface of a first member adjacent to but out of contact with a surface of a second member by action of a fluid boundary layer therebetween while the surfaces are moving in a given direction relative to one another, comprising: means for guiding the surface of the first member in a path of travel; support means; means for fixedly holding the support means with respect to the guiding means; resilient means mounting the second member upon the support means, the second member being connected to the resilient means by pivotal connecting means the axis of which lies transverse to the direction of relative movement of the surfaces; a resilient member disposed between the resilient means and the second member biasing the second member about the axis such that its trailing edge moves toward the first member surface; and stop means engaging the second member for limiting the movement thereof caused by the resilient member whereby the second member is disposed with a predetermined positive angle of attack for being placed in a flying position with respect to the first member.

4. Apparatus as in claim 3 wherein as the first and second member surfaces are maintained out of contact by only the action of the fluid boundary layer therebetween, the first and second members assume a relative position such that the second member is disengaged from and is free for movement with respect to the stop means.

5. Apparatus for maintaining a surface of a first member adjacent to but out of contact with a surface of a second member by action of a fluid boundary layer therebetween while the surfaces are moving in a given direction relative to one another, comprising: means for guiding the surface of the first member in a path of travel; support means; means for fixedly holding the support means with respect to the guiding means; resilient means mounting the second member upon the support means, the second member being connected to the resilient means by pivotal connecting means the axis of which lies transverse to the direction of relative movement of the surfaces; a resilient member disposed between the resilient means and the second member biasing the second member about the axis such that its trailing edge moves toward the first member surface; stop means engaging the second member for limiting the movement thereof caused by the resilient member whereby the second member is disposed with the predetermined positive angle of attack for being placed in a flying position with respect to the first member; means for moving the second member toward and away from the first member surface by other than the fluid boundary action, the last-mentioned means including a rotatable element; flexible means connected to the second member; and means to revolve the element through a predetermined angular movement to wind the flexible means on the element to selectively move the second member toward and away from the first member surface.

6. In a magnetic recording system having a moving fluid stream over the magnetic record surface, the improvement comprising: a magnetic transducer head; a cradle rotatably supporting the head about a pivot axis extending transverse to the record movement; resilient landing control means in the cradle engaging the head for yieldably urging the head to a first rotated position for permitting a fluid separating force to develop between the surface and the head as they are brought together and being operative to release the head for rotation to a second rotated position in response to the fluid separating force; and lifting means directly connected to said cradle to selectively dispose the surface and the head in close or distant association.

7. The invention defined in claim 6 including a stop means mounted on the cradle for engaging the head to limit the rotational movement of the head about the axis in one direction whereby the head is forced into a predetermined angle of attack with respect to the record surface.

8. The invention defined in claim 7 wherein the stop means is adjustable.

9. Apparatus as in claim 6 wherein the pivot axis is removed from the center of gravity of the transducer head at a point so that the weight of the head tends to move a leading edge thereof toward the record surface.

References Cited by the Examiner
UNITED STATES PATENTS

| | | | |
|---|---|---|---|
| 2,038,216 | 4/36 | Harrison | 179—100.2 |
| 2,862,781 | 12/58 | Baumeister. | |
| 2,905,933 | 9/59 | Canepa. | |
| 2,928,709 | 3/60 | Baumeister | 179—100.2 |

IRVING L. SRAGOW, *Primary Examiner.*

NEWTON N. LOVEWELL, BERNARD KONICK, *Examiners.*